US006900975B2

United States Patent
Levi

(10) Patent No.: US 6,900,975 B2
(45) Date of Patent: May 31, 2005

(54) INNER DEVICE FOR NEUTRALIZATION OF ELECTROSTATIC CHARGES FROM MATERIAL IN CONTACT

(75) Inventor: Avram Levi, Istanbul (TR)

(73) Assignee: Sunjit Suni Jut Sanayi Ve Tioaret A.S., Istanbul (TR)

( * ) Notice: Subject to any disclaimer, the term of this patent is extended or adjusted under 35 U.S.C. 154(b) by 115 days.

(21) Appl. No.: 10/328,110

(22) Filed: Dec. 23, 2002

(65) Prior Publication Data

US 2004/0004804 A1 Jan. 8, 2004

(30) Foreign Application Priority Data

Jul. 5, 2002 (TR) .................................... a 2002 01757

(51) Int. Cl.[7] ............................................... H05F 1/02
(52) U.S. Cl. ......................................... 361/220; 383/24
(58) Field of Search ..................... 428/36.1; 361/212, 361/220, 230, 231, 232, 215; 383/24.16

(56) References Cited

U.S. PATENT DOCUMENTS 5,244,281 A * 9/1993 Wiliamson et al. .......... 383/24
5,814,688 A * 9/1998 Hilti et al. .................... 524/9
6,431,435 B1 * 8/2002 Jones et al. ............ 229/117.28
6,572,942 B2 * 6/2003 Wurr et al. ................ 428/36.1

OTHER PUBLICATIONS

International Preliminary Examination Report (IPER).
International Search Report (ISR).

* cited by examiner

Primary Examiner—Ronald Leja
(74) Attorney, Agent, or Firm—Collen IP; Donald J. Ranft

(57) ABSTRACT

The present invention is about a mechanism in the a container such as a FIBC, which enables the immediate neutralization of the electrostatic charges generated during filling, emptying or transporting of the containers. FIBCs are used to carry bulk solid powders, such as sugar, flour, starch and chemical substances. The FIBC, which enables neutralization of the electrostatic charge generated within the material in the bag, developed with this invention, is characterized by inner devices knitted preferably with multi-filaments or mono-filaments and tapes, made of polymers in the form of a web or net with a special antistatic additive, established to an appropriate place in the FIBC so as to have maximum contact with the bulk solid powders in the FIBC in order to neutralize the electrostatic charge at distant points of the FIBC's wall.

20 Claims, 4 Drawing Sheets

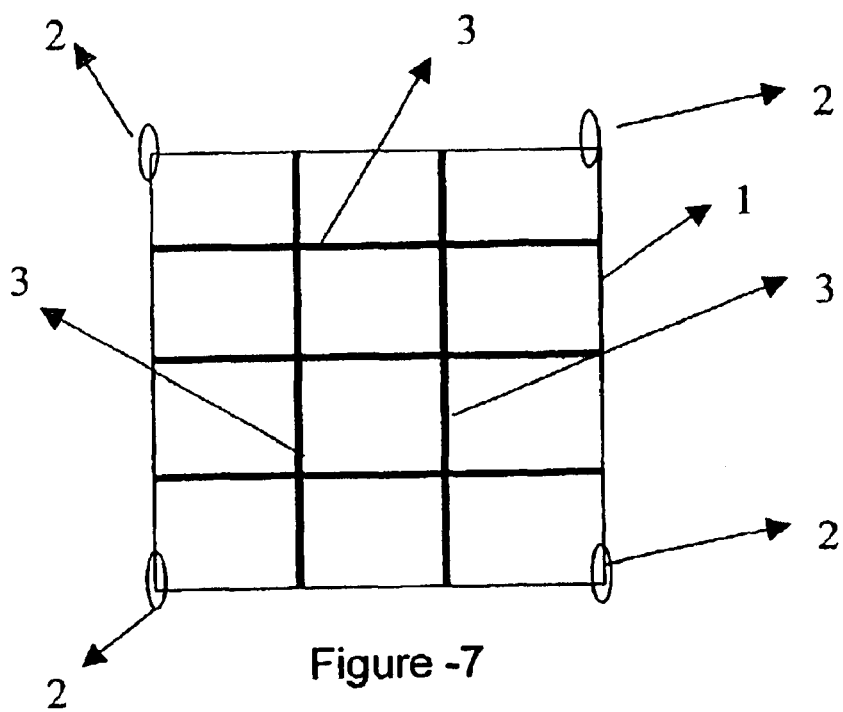
Figure -7
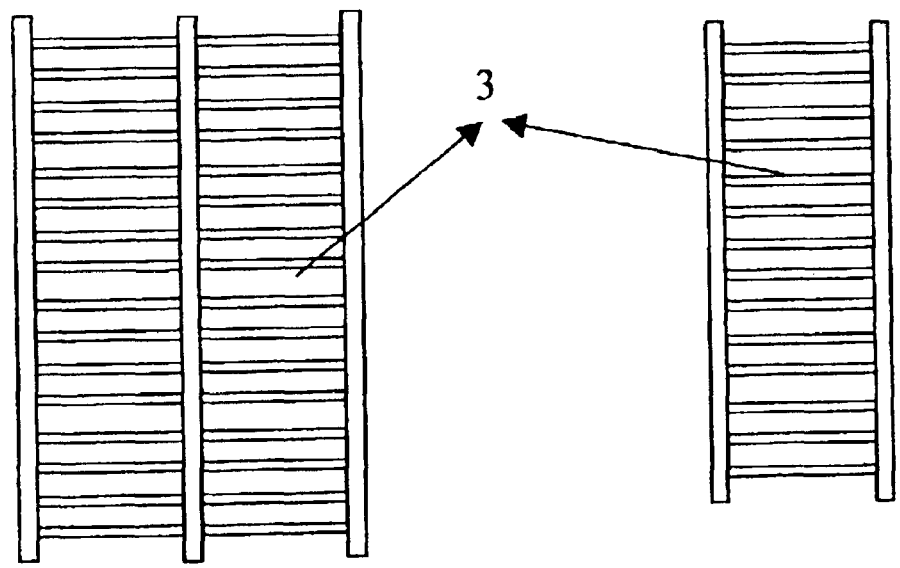
Figure -8
Figure -9

INNER DEVICE FOR NEUTRALIZATION OF ELECTROSTATIC CHARGES FROM MATERIAL IN CONTACT

BACKGROUND

The present invention addresses a mechanism for use in a Flexible Intermediate Bulk Container (FIBC), which enables the immediate neutralization of the electrostatic charges generated during filling, emptying or transporting of the FIBC. FIBC's are used to carry bulk solids powders, such as sugar, flour, starch and chemical substances.

During the filling and emptying of FIBC's which are typically made of polymer-based fabric such as polypropylene, HDPE, LLDPE etc., electrical charges can accumulate on the FIBC and inside the FIBC. Electrostatic charges may cause electrostatic discharges and ignition risks in the presence of flammable atmosphere.

In relation to this issue, there is a patent application TR2001/03444, filed on 28 Nov. 2001 at Turkish Patent Institute, titled "Flexible intermediate bulk container with multiple conductive fibers having permanent antistatic effect". It is explained that the electrostatic charge accumulated on the FIBC is discharged to the surrounding atmosphere by permanent anti-static-treated multi-filaments fibers in the FIBC. With the defined practice in this application the electrostatic charge generated during filling and emptying on the FIBC is neutralized. The static charge generated at a distance from the walls of the FIBC, however, cannot be neutralized immediately.

BRIEF SUMMARY OF THE INVENTION

An object of the present invention is to neutralize any electrostatic charges generated within the material in the FIBC bag during filling, emptying and transporting the FIBC, to avoid ignition risks in the presence of a flammable atmosphere.

The electrostatic changes generated in the material within the FIBC are neutralized in this invention by contact with inner devices which conduct the charge to the atmosphere. These inner devices consist of anti-static fibers configured within the material in the FIBC.

Although the present invention is described and depicted primarily in reference to its use inside FIBC's the principles of the inner devices can be readily adapted by one skilled in the art to other applications such as containers of all sizes including rail cars, trucks, silo's and any other enclosure used for storage/transport of bulk solid powders.

BRIEF DESCRIPTION FIGURES

Figure 1:
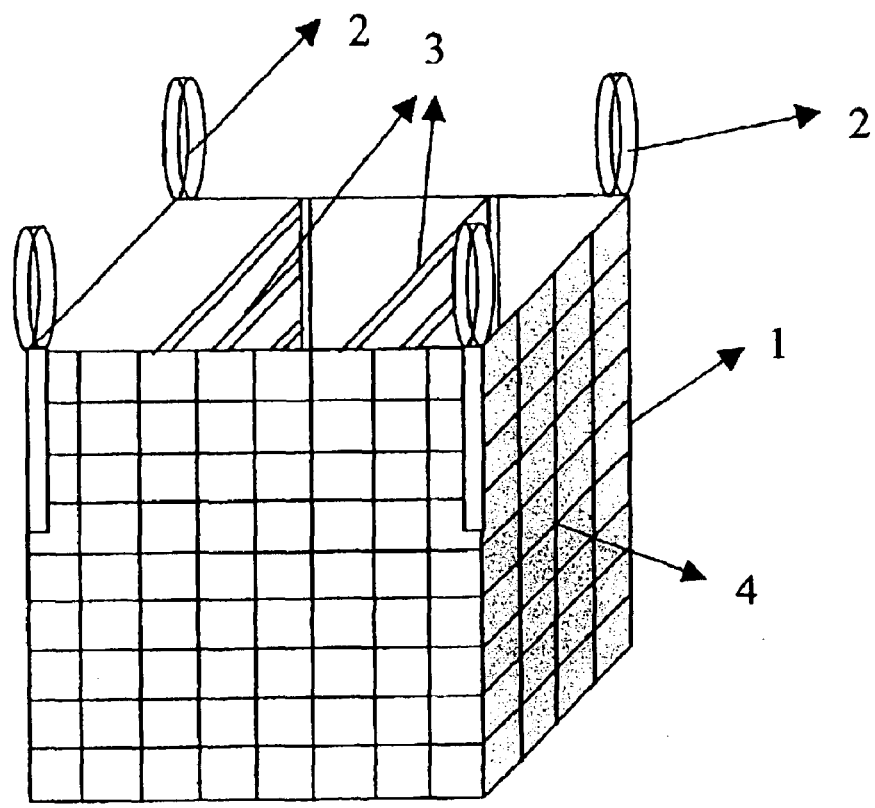
Figure 2:
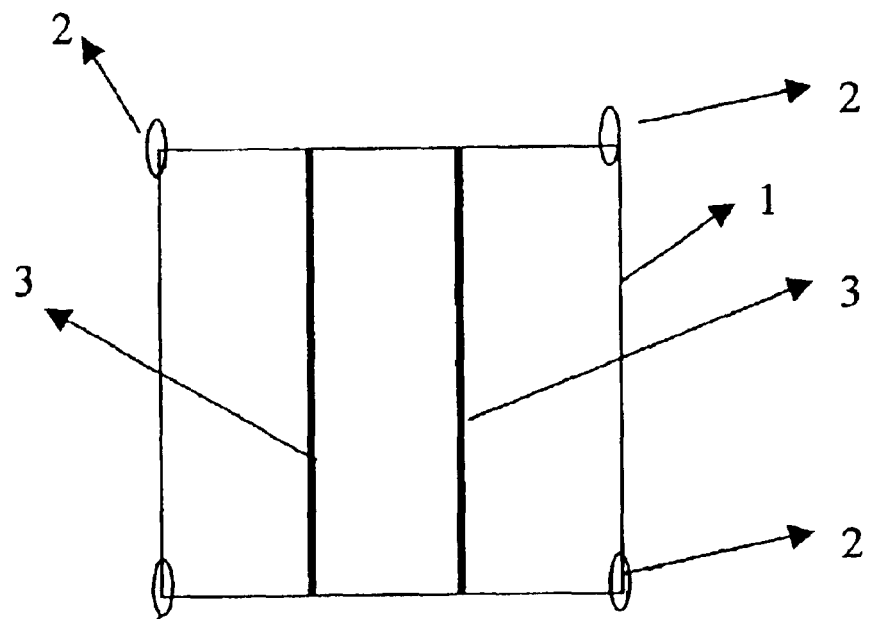
Figure 3:
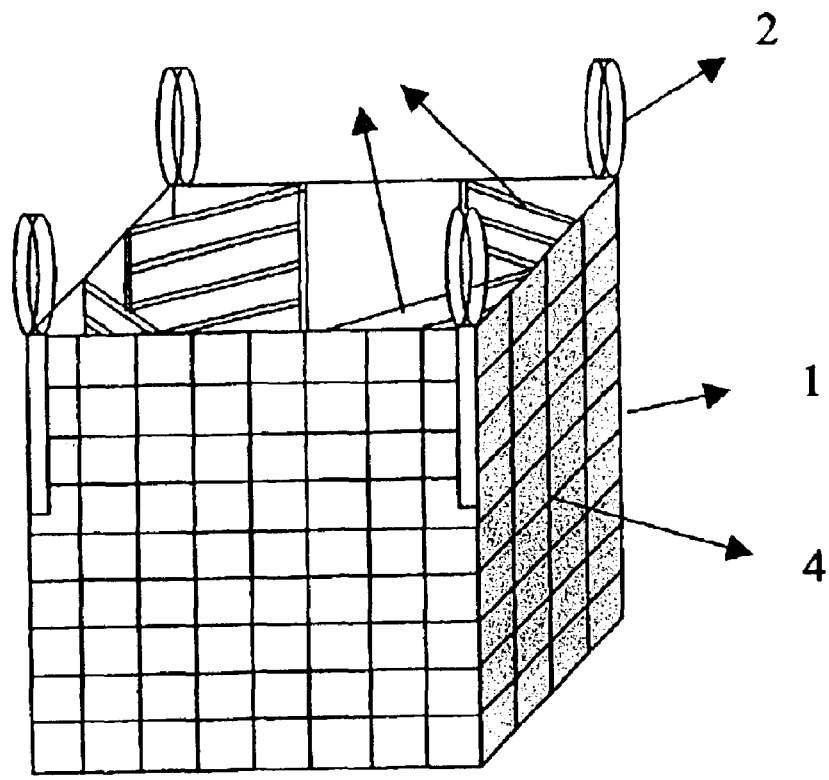
Figure 4:
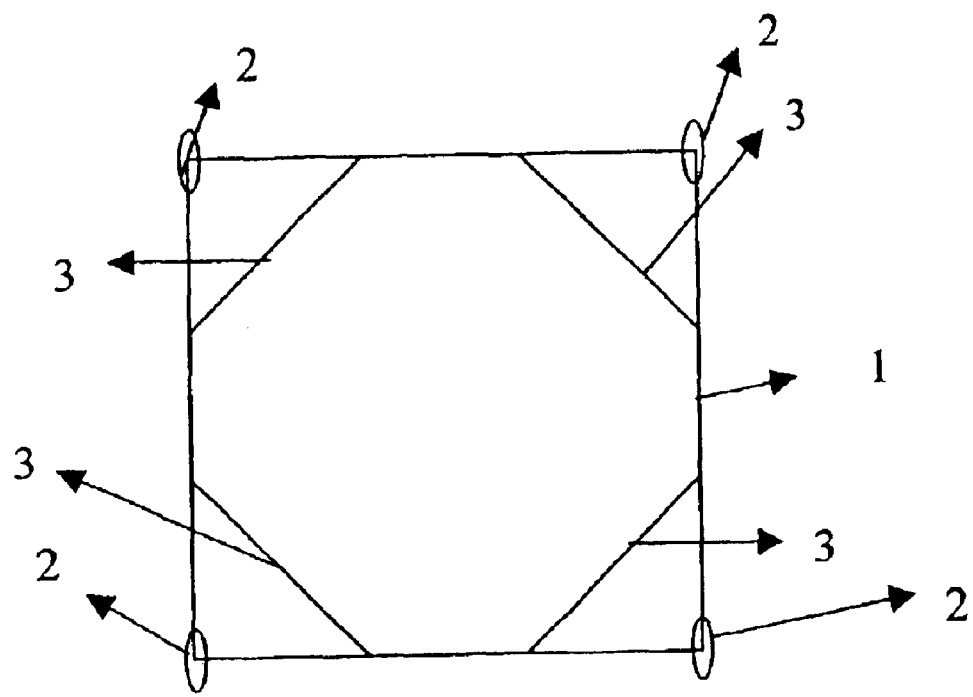
Figure 5:
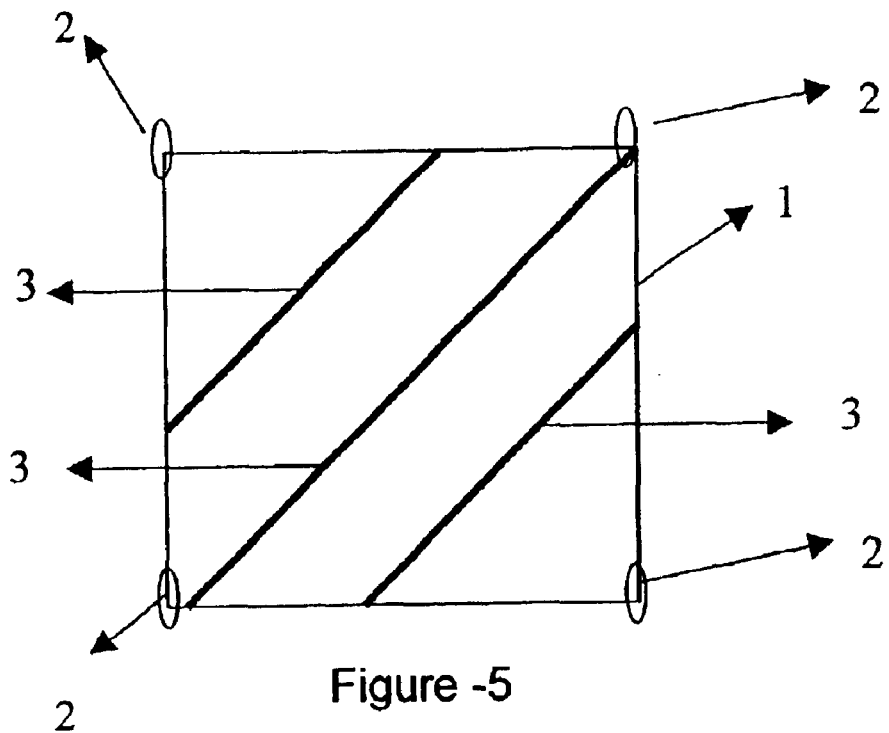

The figures attached for further explanation of the FIBC and inner devices, which enables neutralization of the electrostatic charges within the material in the FIBC, are as follows:

FIG. 1—Perspective view of an example of a FIBC with inner devices for neutralizing electrostatic charge arranged in parallel with side FIG. 2—Top view of an example of a FIBC with inner devices for neutralizing electrostatic charge arranged in parallel with one side FIG. 3—Perspective view of an example of a FIBC with inner devices for neutralizing electrostatic charge arranged across to the corners FIG. 4—Top view of an example of a FIBC with inner devices for neutralizing electrostatic charge arranged across to the corners FIG. 5—Top view of an example of a FIBC with inner devices for neutralizing electrostatic charge arranged in parallel diagonally across the FIBC.

Figure 6:
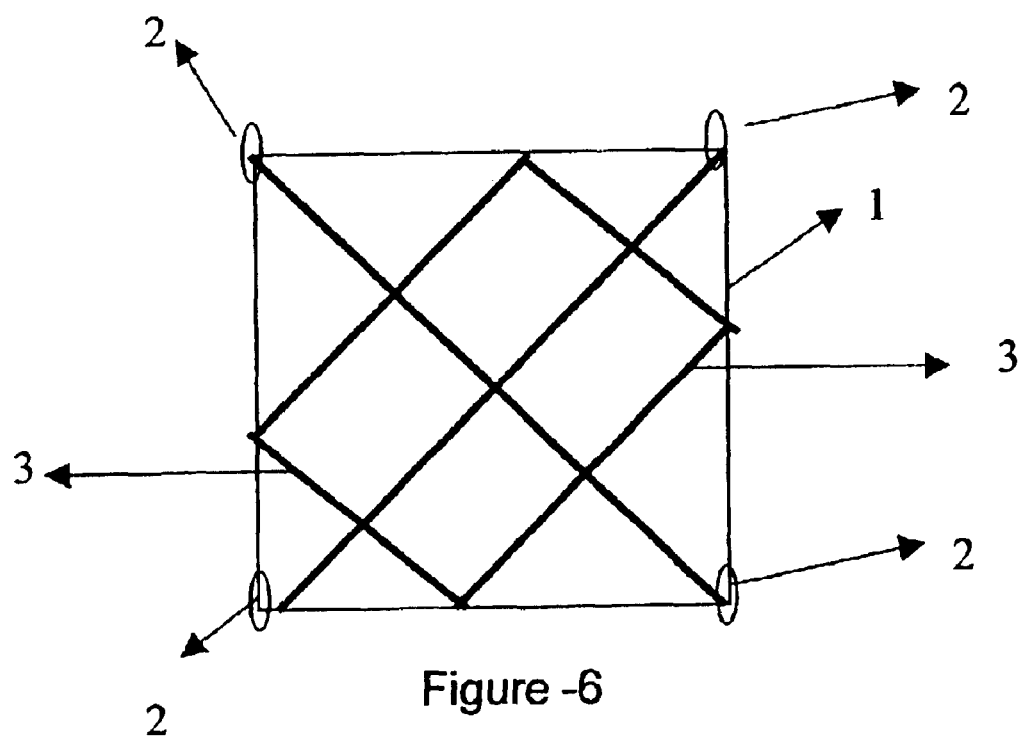

FIG. 6—Top view of an example of a FIBC with inner devices for neutralizing electrostatic charge arranged in parallel crisscrossing diagonally across the FIBC.

FIG. 7—Top view of an example of a FIBC with inner devices for neutralizing electrostatic charge arranged in parallel and perpendicular to opposing sides of the FIBC.

FIG. 8—Front view of an example of an inner device for a FIBC, in the shape of a ladder (double column).

FIG. 9—Front of an example of an inner device for a FIBC, in the shape of a ladder or web (single column).

DETAILED DESCRIPTION OF INVENTION

The FIBC (1), which enables neutralization of the electrostatic charge generated within the material in the bag, developed with this invention, is characterized by inner devices (3) knitted preferably with multi-filaments or mono-filaments and configured in the various forms including ladder, web, or net, with a special antistatic additive. The FIBC inner devices are arranged in an appropriate configuration within the FIBC so as to have maximum contact with the bulk solids powders in the FIBC in order to neutralize the electrostatic charge at a distance from the FIBC's walls. There can be any number of internal devices as warranted to adequately neutralize the material within the bag. Sample configurations of these internal devices are depicted in FIGS. 1–7. These inner devices (3) are configured in various geometrical forms and configurations to enable the neutralization of the electrostatic charge generated during filling, emptying and transporting and are preferably made of the same material as the sides.

The inner devices are comprised of mono-filament or multi-filament fibers. These fibers for neutralizing the electrostatic charges preferably include permanent antistatic additives such as IRGASTAT P18 or IRGASTAT P22 manufactured by Ciba Geigy® at a ratio of %6–%20 preferably. The said inner devices (3) are produced from materials which can conduct electricity at each point. These antistatic agents are polyamide/polyether block amides which are incorporated as melt additives.

The resistance of the inner devices (3) of the FIBC (1), which enables neutralization of the electrostatic charge generated within the material in the (FIBC), is $10^7$ and $10^{12}$ ohms/square.

The fibers added to the inner devices (3) of the FIBC (1), consist of polyamide and fiber conductive material with diameters of approximately 0.2 to 15 $\mu$m (micron) and are constructed in the inner devices so as to form a web, net or ladder configuration Handles (2) are preferably provided to facilitate transport.

The inner devices (3) are configured in any appropriate arrangement or shape in a manner to maximize contact with the bulk material with which the FIBC is filled. This includes, but is not limited to, inner devices configured in parallel, diagonally or centrally within the FIBC in reference to the side and bottom walls.

The inner devices (3) are preferably made of materials which readily conduct electricity to the FIBC outer walls by direct contact with the lateral devices (4).

I claim:

1. An inner device comprising:
   anti-static fibers;
   the anti-static fibers configured to maximize contact with
      a material to be neutralized;

the antistatic fibers connected at the outer limits of the material to conduct electrostatic charges to atmosphere via contact with an outer container which is configured to contain the inner device;

the outer container having an open cavity; and the inner device traversing the inner cavity of the outer container.

2. An inner device according to claim 1 in which the anti-static fibers are mono-filament.

3. An inner device according to claim 1 in which the anti-static fibers are multi-filament.

4. An inner device according to claim 1 in which the fibers comprising the inner device are configured in a interconnected manner.

5. An inner device according to claim 1 in which the diameter of the fibers ranges from 0.2 to 15 $\mu$m (micron).

6. An inner device according to claim 1 in which the inner device is characterized by a resistance ranging from $10^7$ to $10^{12}$ ohms/square.

7. An inner device according to claim 1 in which the inner device is made of materials which conduct electricity.

8. An inner devise according to claim 1 in which the container is made of the same material as the inner device.

9. A plurality of inner devices according to claim 1 which are configured within the container in an arrangement that facilitates maximum contact with the material within the container.

10. An inner device according to claim 1 in which the container is a Flexible Intermediate Bulk Container (FIBC).

11. An inner device according to claim 1 in which the anti-static fibers include anti-static additives of polyamide and fiber conductive material.

12. An inner device according to claim 11 in which the additive is a permanent antistatic agent.

13. An inner device according to claim 12 in which the additive is in the range of 6–20%.

14. A method of neutralizing the electrostatic charge generated by material consisting of:

configuring an inner device of anti-static fibers;

configuring the anti-static fibers comprising the inner device in a manner to maximize contact with material to be neutralized;

connecting the anti-static fibers to the outer limits of the material to conduct static electricity to atmosphere via contact with an outer;

container which is configured to contain the inner device and material creating the outer container to include an open inner cavity; and configuring the inner device to transverse the inner cavity of the outer container.

15. A method according to claim 14 in which the anti-static fibers include anti-static additives of polyamide and fiber conductive material.

16. A method according to claim 14 in which a plurality of inner devices are configured within the container.

17. A method according to claim 14 in which the container is made of the same material as the inner device.

18. A method according to claim 14 in which the container is a FIBC.

19. A method according to claim 14 in which the diameter of the fibers ranges from 0.2 to 15 $\mu$m (micron).

20. An inner device according to claim 14 in which the inner device is made of materials which conduct electricity.

* * * * *